June 3, 1930. J. S. BUSHEY 1,761,516
METHOD OF ADJUSTING CAMBERS IN AUTOMOBILE WHEELS
Filed Aug. 5, 1926
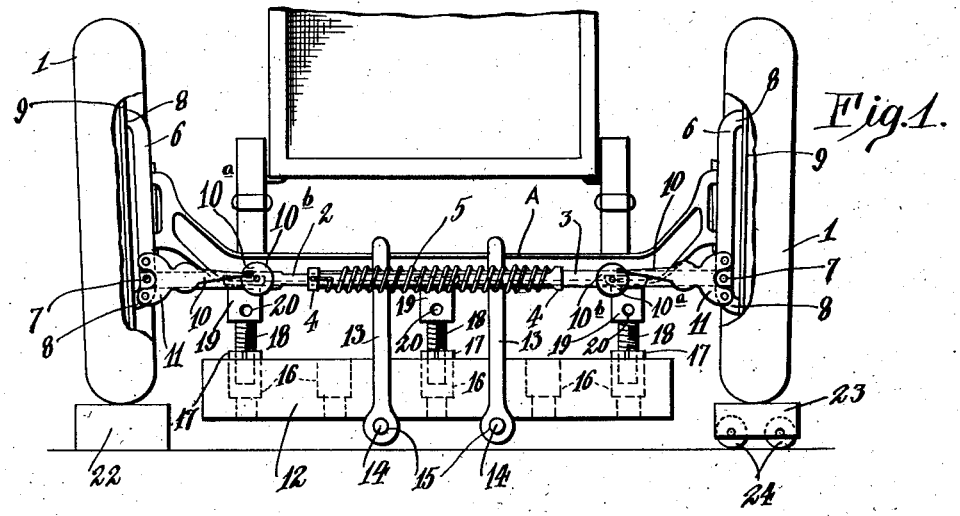
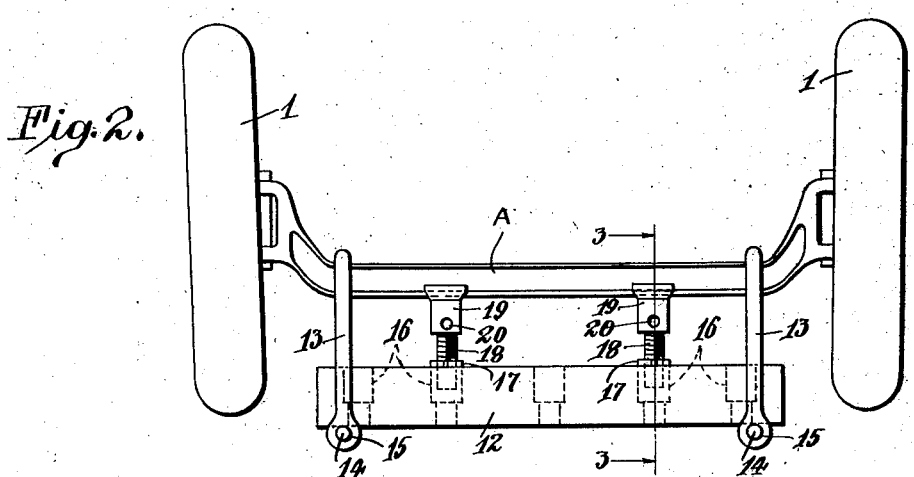
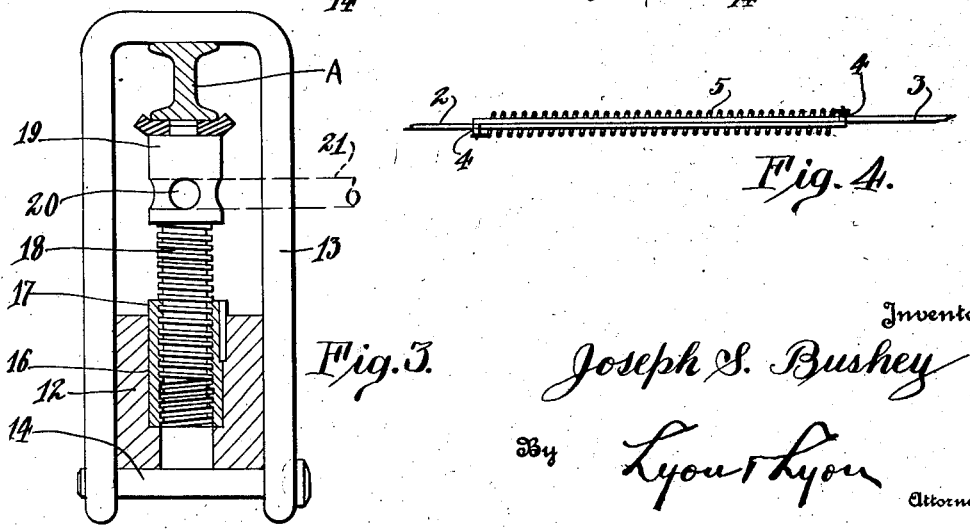
Inventor
Joseph S. Bushey
By Lyon & Lyon
Attorneys Patented June 3, 1930

1,761,516

UNITED STATES PATENT OFFICE

JOSEPH S. BUSHEY, OF LOS ANGELES, CALIFORNIA

METHOD OF ADJUSTING CAMBERS IN AUTOMOBILE WHEELS

Application filed August 5, 1926. Serial No. 127,356.

This invention relates to the adjustment of the camber of automobile wheels. It is common practice in mounting the front wheels on an automobile axle to mount them so that the middle plane of the wheel is tilted slightly in an outward direction at the upper edge of the wheel. The amount of tilt or angle the the wheel is out of the vertical plane is referred to as "camber." It is believed that with a slight amount of camber, the wheels can be steered with ease and at the same time exert a slight tendency to maintain themselves in a front and rear direction on the automobile.

The position of the wheel on the axle of course depends upon the position of the axis of the knuckle bearing for the wheel, and if the end of the axle adjacent the wheel is not perfectly true, for example, from warping or any other reason, the wheel will not be held in its true position; in other words, the camber of the wheel will be incorrect. This necessitates considerable accuracy in the construction of the automobile axle and in the boring of the knuckle bearings.

In my application for patent, Serial No. 88,838 (Patent No. 1,658,792, dated Feb. 14, 1928), I disclosed a simple apparatus for effecting the adjustment of an automobile axle while in the car or automobile for adjusting the camber of the wheels. The apparatus disclosed in that application is the apparatus which I prefer to use for practicing my novel method of adjusting the camber which forms the subject matter of the present application.

The general object of my invention is to provide a simple method for effecting the adjustment of the camber of either or both wheels without dismounting the axle or the wheels; also to provide a method which will enable the wheels to be accurately adjusted so that the camber of both wheels will be equal.

Further objects of the invention will appear hereinafter.

The invention consists in the novel steps and combination of steps described in the following specification, all of which contribute to produce a simple and efficient method for adjusting the camber of automobile wheels.

In the drawing:

Figure 1 is a front elevation, with parts broken away, illustrating the manner in which my novel method is practiced, and illustrating apparatus which I prefer to use for this purpose. This view shows the method as used for reducing the camber in the wheels.

Figure 2 is a view similar to Fig. 1, but showing the organization of the apparatus when the camber of the wheels is to be increased.

Figure 3 is a vertical section taken about on the line 3—3 of Fig. 2, upon an enlarged scale, some parts being shown in elevation and further illustrating details of the apparatus.

Figure 4 is a longitudinal section through the middle portion of the gauge to illustrate the manner in which the gauge is constructed so that it cooperates in the practice of my method.

In practicing my method, I support the axle with its wheels attached, and subject it to a bending moment in a vertical plane sufficient to bend the same; and I gauge the wheel or wheels immediately to indicate the amount of camber.

Any suitable apparatus may be employed for practicing the method. I prefer, however, to employ the apparatus disclosed in my application referred to hereinabove. In practicing the method, I prefer to utilize a double gauge which operates to indicate the camber of both wheels 1 of the automobile, simultaneously. This gauge is of a common type now in use. In its construction, it includes two bars 2 and 3 which overlap each other and slide upon each other at their inner ends, each bar being provided with a guide 4 through which the other bar slides. Between the guides 4, a coil spring 5 is provided which encircles the overlapping portions of the bars. This spring is a tension spring and exerts its force to pull the bars in a direction to extend or expand the gauge.

At the outer end of each bar, a gauge head 6 is attached to the bar on a pivot pin 7. The ends of this gauge head 6 are formed into feet 8 which rest upon the side of the wheel rim 9

(see Fig. 1). Each gauge head 6 carries an indicator or pointer 10, the outer portion of which is formed into a yoke 11 which is riveted to the gauge head, and the point of the pointer 10 extends radially from the pivot pin 7 and cooperates with a scale 10ª carried on a fixed plate 10ᵇ which is secured to the side of the gauge.

In using this gauge, I set it up in the manner indicated in Fig. 1, and while the gauge is in position, I subject the axle to any bending moments which are necessary to give the wheels the desired camber, or to equalize the camber in the two wheels; these bending movements are in a vertical plane, that is to say, in a plane at right angles to the plane passing through the tread of the tires. In the present instance, the right-hand pointer 10 is slightly higher on the scale than the left-hand pointer, and would indicate that the camber of the wheels is unequal. According to my method, while the gauge is in place, I would then subject either end of the axle to the proper bending moment to bend or set the axle slightly and develop the desired camber in the wheels.

In order to do this, I prefer to use a bending device which I support on the axle itself. This bending device, when constructed as illustrated in my former application, includes a strong back or bar 12 of steel, which may be slung over the axle A on a pair of inverted U-bolts 13, the arms of each U-bolt carrying a cross pin 14 connecting the eyes 15, and the bar 12 rests on these pins. The upper side of the bar 12 is provided with a plurality of sockets 16 to receive sleeves 17, respectively, said sleeves being internally threaded and operating as fixed nuts for jack screws 18, having heads 19 which can be rotated by means of a bar inserted in the sockets 20. In Fig. 3, a bar 21 is indicated in dotted lines to indicate such a use on the head of the jack screw. With the bending apparatus arranged as shown in Fig. 1, it will be evident that if the jack screws 18 on the outer ends are tightened up, the ends of the axle can be bent upwardly. This will reduce the camber in the wheels.

In Fig. 2, the slings 13 are placed at the outer ends of the axle and the jack screws are mounted in the intermediate sockets 16, so as to enable the axle to be bent in the opposite direction, that is to say, the ends of the axle can be bent down so as to increase the camber.

In using the apparatus, the wheels 1 of the automobile are preferably supported on two blocks 22 and 23, the latter of which is mounted on rollers 24. These rollers permit the wheels of the car to move further apart or to approach each other without disturbing the tires on their rims.

Attention is called to the fact that in the practice of this method, superior results are attained as compared with any method in the operation of which the axle is bent with the wheels removed from it. By bending the axle while it carries the wheels, the camber can be gauged on the wheels themselves, and it is possible to give the wheels exactly the proper amount of camber by watching the gauge pointers while the bending process is going on.

Another advantage of my method resides in the fact that while the axle is being bent, it may support the weight of the body and all other parts of the automobile carried by the chassis. These weights are substantial, and to a certain extent affect the camber of the wheels. In other words, the weight of the body on the axle produces a slight deflection, and with my preferred method, the bending occurs while this deflection is in the axle. Hence, there is no change in the camber, as might occur with other methods where the weight of the body comes onto the axle after it has been bent to the proper camber.

The important feature of my method is, however, that the bending of the axle takes place while the wheels are in place on the axle.

It is understood that the embodiment of the invention described herein is only one of the many embodiments this invention may take, and I do not wish to be limited in the practice of the invention, nor in the claims, to the particular embodiment set forth.

I claim:

1. The method of adjusting the camber of an automobile wheel which consists in supporting the axle on its wheels, subjecting the axle to a bending moment in a plane substantially at right angles to the plane passing through the tread of the wheels sufficient to bend the same, and gauging the wheel to indicate the camber.

2. The method of adjusting the camber of automobile wheels which consists in supporting the axle of the automobile in its normal position relative to the chassis and wheels with its wheels attached, subjecting the axle to a bending moment in a plane substantially at right angles to the plane passing through the tread of the wheels sufficient to bend the same, and simultaneously gauging the camber of the wheels.

3. The method of adjusting the camber of the wheels of an automobile which consists in supporting the axle and the body weights of the automobile on its wheels, subjecting the axle to a sufficient bending moment in a plane substantially at right angles to the plane passing through the tread of the wheels to set the same and thereby give the desired camber to the wheels, and simultaneously gauging the camber of the wheels.

4. The method of adjusting the camber of the wheels of an automobile which consists in subjecting the axle to a bending moment in a plane substantially at right angles to the plane passing through the tread of the wheels, said bending moment being sufficient to bend the axle and alter the camber of the wheels while the wheels are in place on the axle, and gauging the wheels to indicate their camber.

Signed at Los Angeles, California, this 29 day of July, 1926.

JOSEPH S. BUSHEY.